Patented Mar. 22, 1932

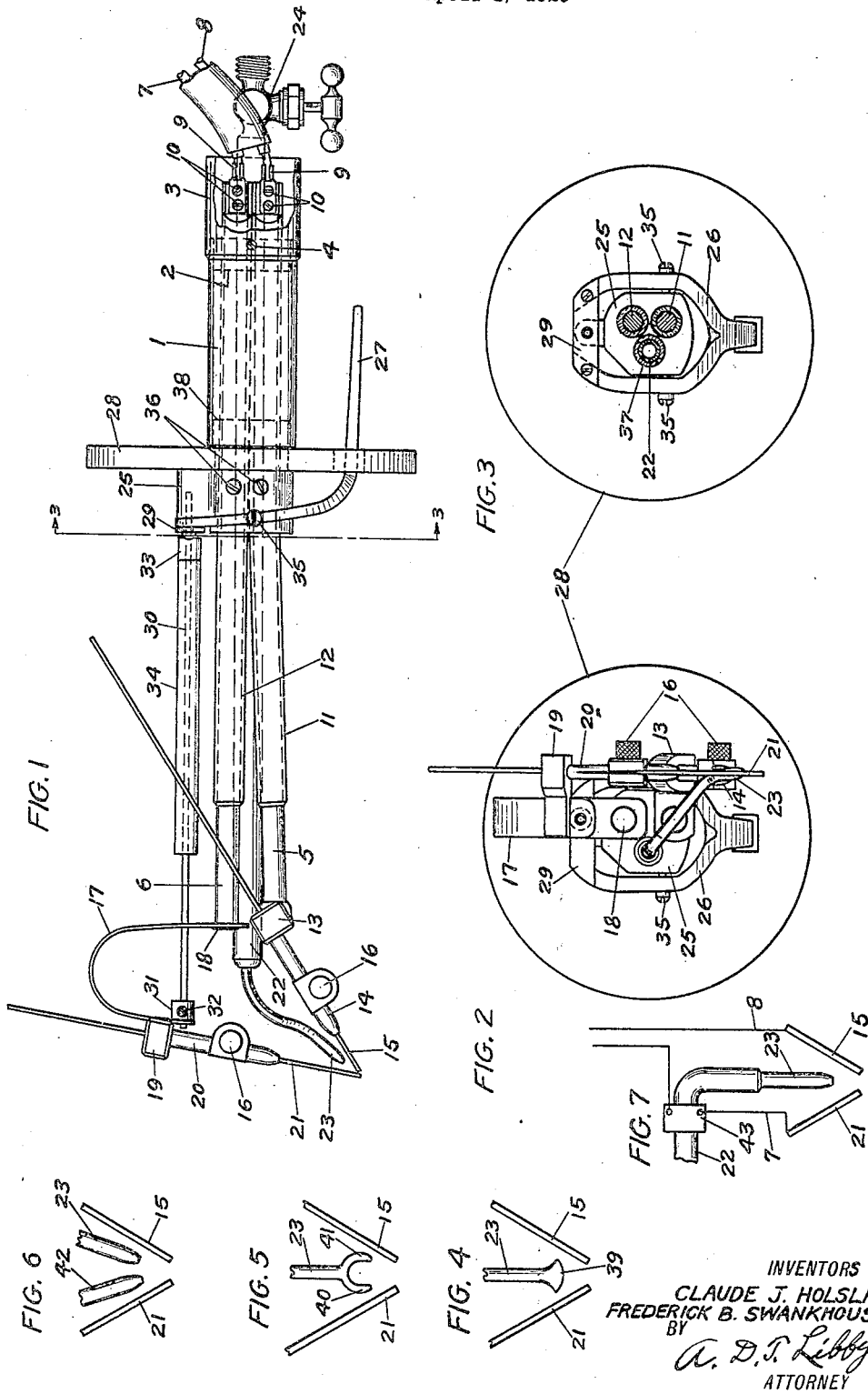

1,850,172

UNITED STATES PATENT OFFICE

CLAUDE J. HOLSLAG, OF SOUTH ORANGE, AND FREDERICK B. SWANKHOUS, OF BELLEVILLE, NEW JERSEY, ASSIGNORS TO ELECTRIC ARC CUTTING & WELDING COMPANY, OF NEWARK, NEW JERSEY

WELDING TOOL

Application filed April 1, 1929. Serial No. 351,709.

This invention relates to a welding tool of a special character particularly designed for use in welding special material where the current at the welding arc must necessarily be relatively low in value because of the increased voltage.

In welding work, it is highly desirable that oxidation be kept as low as possible and that the temperature at the weld be controlled to a certain degree. It is therefore one of the objects of our invention to provide a welding tool which can be fitted with suitable electrodes between which the arc may be set up, and also to provide means under control of the operator using the tool, to supply a suitable gas directly at the arc for the purposes hereinafter set forth.

Another object of our invention is to provide a welding tool in which electrodes and the gas supply are all condensed into one operating mechanism.

These and other objects will be clear to one skilled in this art after a study of the specification taken in connection with the drawings, wherein—

Figure 1 is a side view of the complete welding tool.

Figure 2 is an end view looking from the left of Figure 1.

Figure 3 is a sectional view on the line 3—3 of Figure 1.

Figure 4 shows the electrode ends separated and the gas nozzle as fish-tail shaped.

Figure 5 is a view similar to Figure 4, except the gas nozzle is divided into two prongs.

Figure 6 is a view similar to Figures 4 and 5, except that two gas nozzles are used.

Figure 7 is a diagram showing one way of controlling the gas supply pipe by an electrical valve.

In the drawings wherein like numbers refer to corresponding parts in the various views, 1 is a sleeve or handle portion comprising a hollow tube of good insulating material. The outer end of the tube 1 is provided with a brace and guide washer 2, while the inner end is supported on a similar member 38, both being preferably of strong insulating material. Attached to the sleeve 1 and washer 2, is a collar 3 of insulating material. The collar 3 may be held to the washer 2 in any satisfactory manner as by screws 4.

Positioned within the handle portion 1 and extending therethrough, is a pair of metallic members 5 and 6 which are of suitable conducting material. The members 5 and 6 may be solid rods, or may be hollow cylindrical members to give lightness, it being understood that they are of desired current carrying capacity to carry the current supplied by the conductors 7 and 8 which are attached to the handle end in any satisfactory manner as by terminals 9, which may be soldered or attached by screw 10 to the ends of the members 5 and 6. Fitting over the metallic members 5 and 6, are insulating tubes 11 and 12 which extend through the handle portion 1 and preferably nearly to the outer extremity of the members 5 and 6.

Fastened to the member 5, preferably in a rigid manner, is a clamp 13 having a split tubular portion 14, adapted to receive an electrode 15 which may be adjustably held in the clamp and tubular portion by a clamp nut 16. To the outer end of the metallic member 6, is fastened a spring member 17 as by riveting over the end 18 of the member 6 so as to fasten the spring member 17 securely in position. Attached to the spring member 17 near its end, is a second clamp 19 having a tubular portion 20, similar to the part 14, and this tubular member is split in the same manner as 14 to hold an electrode 21 which is adapted to cooperate with electrode 15 to produce an arc therebetween.

Extending also through the handle portion 1, is a gas tube 22 terminating in the nozzle 23 closely adjacent the working ends of electrodes 15 and 21. The handle end of the gas tube 22 is provided with a control valve 24 for the purpose of regulating the amount of gas fed to the nozzle 23. A support collar 25 is provided adjacent the end of the handle portion 1, and to this collar 25 is attached a forked lever 26, having an end 27 extending rearwardly through a guard plate 28 which is preferably of strong insulating material.

The end 27 of the lever 26 is positioned near the handle portion 1, so that the operator in holding the handle may engage the end 27 to operate the lever 26. To the bifurcated ends of the lever 26, is attached a cross-bar 29 which supports one end of a rod 30, the other end of which has a working connection with the free end of the spring member 17. As illustrated, this working connection is obtained by allowing the end of the rod 30 to pass through a hole within the end of the spring member 17 and a collar 31 fastened to the rod 30 by any suitable means as by set screw 32. The rod 30 is also supplied with a loose collar 33 adjacent the bar 29. Preferably, the rod 30 is insulated by tubular insulator 34 which is fastened thereto and adapted to act as stop for the collar 33.

The arms of the lever 26 are pivoted by the screws 35 to the collar 25 which is clamped to the insulators 11 and 12 by screws 36. Preferably, the tube 22 is provided with a tubular insulator 37 so as to be sure that all the parts are satisfactorily insulated one from the other.

In operation, we prefer to use hydrogen gas at the arc set up between the electrodes 15 and 21 when the operator starts the arc by pressure on the portion 27 of the lever 26. This pressure actuates the rod 30 against the normal tension of the spring 17 which acts to hold the electrodes in closed position as shown in Figure 1, it being assumed that suitable current is supplied to the conductors 7 and 8 at the separation of the electrodes 15 and 21 to start an arc between these electrodes which are preferably of tungsten, which has a high melting point. Starting of the arc, immediately ignites the hydrogen coming through the nozzle 23 and the arc bathed in water vapor, is then played on the work to be welded, and if necessary, the operator with his other hand may feed in additional metal by a separate electrode when required.

In our study of this process of welding by the use of hydrogen gas, we believe the action is as follows:

Due to the very high heat of the electric arc, the metallic electrodes even though of tungsten which has a high melting point, would be rapidly burned up, and likewise the thin metal on which the arc is played would also be burned or melted beyond control. Therefore, to put the work under the control of the operator, a given amount of hydrogen is fed out of the nozzle 23 which is placed immediately adjacent the arc formed by the electrodes 15 and 21, and this burning hydrogen produces water vapor which lowers the temperature of the arc to a point where the welding may be expeditiously carried out without burning up the tungsten electrodes with undue rapidity, or without burning up the work. In other words, by adjusting the valve 24 to the proper point, we can regulate with nicety to a high degree the welding operation to suit the thickness or character of the work that is to be welded, it being understood that our source of current supply to the conductors 7 and 8 is of a suitable character, such as provided from the transformer shown in Holslag Patent 1,305,363, or described and claimed in Holslag application S. N. 348,697, filed March 21, 1929.

In Figure 4, we have shown the nozzle 23 in the shape of a fish-tail 39. In Figure 5, the nozzle 23 is split into two prongs 40 and 41, while in Figure 6, the gas supply pipe ends in two nozzles 23 and 42, which may be adjustable to the right angle. In all of these forms, the idea is to spread the hydrogen or other gas coming from the nozzle over a larger surface than can be obtained by the nozzle shown in Figure 1.

In order that no free hydrogen or other gas which may be used shall accumulate around the electrodes before the arc is struck, whereby a dangerous explosion might occur on striking the arc, we can use the arrangement shown in Figure 7. Here an electrical valve 43 is used to open the gas line on striking the electrodes. The valve 43 may be mounted on or incorporated in the handle or placed at a distance near the current supply and may be operated by the current flowing directly in the arc circuit, or it may be connected across the electrodes in shunt to the arc. In either case, the valve 43 closes by spring action when the welding arc is stopped. The valve 24 may still be used as a further safe-guard and to regulate the amount of flow of gas coming through valve 43, which is preferably either full open or closed as the case may be.

While we have illustrated and described a practical form of our invention which we have used with great success, it will be clear that certain of the mechanical details may be varied without departing from the spirit of our invention or the scope of the appended claims.

Having thus described our invention, what we claim is:

1. A welding tool including; a handle portion, a guard plate, a pair of metallic members insulated from each other and extending through the handle and beyond the guard plate, means for attaching current conductors to said metallic members, an electrode clamp rigidly fastened to the extremity of one of said metallic members, a second electrode clamp resiliently attached to the extremity of the other of said metallic members and normally held in a given position, both of said clamps having means for adjustably supporting electrodes therein, a lever mounted adjacent said guard plate and having a part extending through the plate near the handle, a rod extending from the lever to and having a working connection with the second mentioned clamp for moving the clamp and its electrode from its normal position to strike and hold an arc, and a gas tube extending through the handle along with said metallic members and having a nozzle independent of said electrode clamps terminating adjacent the ends of electrodes when properly positioned in said clamps.

2. A welding tool including; a handle portion, a guard plate, a pair of metallic members insulated from each other and extending through the handle and beyond the guard plate, means for attaching current conductors to said metallic members, an electrode clamp rigidly fastened to the extremity of one of said metallic members, a curved spring having one end attached to the extremity of the other of said metallic members, a second electrode clamp fastened to the free end of said curved spring, both of said clamps having means for adjustably supporting electrodes therein, a lever mounted adjacent said guard plate and having an operating part extending through the plate near the handle, a rod extending from the lever to and having a working connection with the free end of the spring near the second mentioned clamp for moving the clamp and its electrode to strike and hold an arc, and a gas tube extending through the handle along with said metallic members and having a nozzle independent of said electrode clamps terminating between the ends of the electrodes when properly positioned in said clamps.

3. A welding tool including; a handle portion, insulated metallic members carried within said handle and extending some distance beyond the handle portion, a clamp attached to each member at the end of said extended parts, said clamps having hollow portions to receive an electrode and means for locking the electrodes in adjusted position in the clamp, means for manually shifting one of said clamps to control the arc, and a gas tube carried by the handle portion and having a nozzle independent of said electrode clamps terminating close to the arc ends of the electrodes.

4. A welding tool including; a handle portion, insulated metallic members carried within said handle and extending some distance beyond the handle portion, a clamp attached to each member at the end of said extended parts, said clamps having hollow split portions to receive an electrode and means for moving the split portions to grip the electrode, a resilient member between one of said clamps and its said cooperating metallic member, a lever near the handle portion adapted to be operated by the hand of the operator, a rod between the lever and said resilient member for moving it and the associated clamp to establish and control the arc, a gas tube carried by the handle portion and having a nozzle independent of said electrode clamps terminating close to the arc ends of the electrodes.

5. An electric welding tool including; a handle portion, a pair of metallic insulated conducting members and a gas tube carried thereby and extending a considerable distance beyond one end thereof, a collar adjacent one end of the handle portion to support said members, and tube, electrode clamps on the extended ends of said metallic members, one of said clamps being mounted so it may be moved to strike an arc between the electrodes, a lever mounted on said collar, means connected between the lever and said movable clamps for transferring motion from the lever to the clamp, a part of said lever extending near said handle portion for actuation by the hand of the operator, said gas tube adapted to have a gas supply line attached thereto, and also having a nozzle independent of said electrode clamps terminating near the arc end of said electrodes, means for insuring that the electrodes are normally closed, and a valve to control the amount of gas going to the arc.

6. In an electric welding tool for the purposes described including; a pair of clamps for adjustably gripping metallic electrodes, a spring associated with at least one of said clamps for moving it so the electrodes may normally touch, means for conveying current to said clamps, means for moving at least one of said clamps to control the arc between the electrodes, and a tube forming an element of the tool adapted to have a gas supply line attached thereto, and also having a nozzle for feeding a desired gas to the arc, and an electrically operated valve for opening the gas line only on striking the electrode arc.

7. In an electric welding tool for the purposes described including; a pair of clamps for adjustably gripping metallic electrodes, a spring associated with at least one of said clamps for moving it so the electrodes may normally touch, means for conveying current to said clamps, means for moving at least one of said clamps to control the arc between the electrodes, means for conveying a desired gas to the arc for the purpose set forth, and a valve actuated by operation of the electrodes in striking the arc to admit from said conveying means said gas to the action of the arc.

8. An electric welding tool for the purposes described, including; a handle portion, a pair of metallic conducting members carried by the handle portion but insulated from each other, said members extending from at least one end of the handle, a pair of electrode clamps carried at an angle on the extended ends of said metallic members, a spring carried by at least one of said metallic members and having one end attached to one of said clamps and acting on the said clamp so as to cause the electrodes carried by the clamps to be normally in contact, means for conveying current to said clamps, means for moving at least one of said clamps to strike an arc between the electrodes, a tube forming an integral element of said tool and having a nozzle independent of said electrode clamps terminating near the arc end of the electrodes for feeding a desired gas around the arc and a valve to control the flow of gas through said tube.

In testimony whereof, we affix our signatures.

CLAUDE J. HOLSLAG.
    FREDERICK B. SWANKHOUS.